United States Patent
Klarer

(10) Patent No.: US 6,241,416 B1
(45) Date of Patent: Jun. 5, 2001

(54) AGILE MOBILITY CHASSIS DESIGN FOR ROBOTIC ALL-TERRAIN VEHICLE

(75) Inventor: Paul R. Klarer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/333,789

(22) Filed: Jun. 14, 1999

(51) Int. Cl.[7] .............................. F16C 11/00; B62D 11/04
(52) U.S. Cl. ...................... 403/113; 403/112; 403/117; 403/119; 403/315; 403/316; 403/180; 180/6.2; 180/6.48
(58) Field of Search ................................. 403/119, 152, 403/153, 154, 157, 158, 113, 117, 112, 316; 296/180; 180/648, 21, 6.2

(56) References Cited

U.S. PATENT DOCUMENTS

| | | | |
|---|---|---|---|
| 1,384,186 | * | 7/1921 | Fullington ........................... 403/152 |
| 1,420,251 | | 9/1922 | Parker . |
| 1,430,251 | * | 9/1922 | Parker ................................ 180/21 X |
| 3,140,066 | * | 7/1964 | Sutton et al. ..................... 403/119 X |
| 4,083,513 | * | 4/1978 | Pfarrawaller ..................... 403/343 X |
| 4,491,436 | * | 1/1985 | Easton ............................. 403/131 X |
| 5,228,797 | * | 7/1993 | Ota et al. ......................... 403/119 X |
| 5,320,443 | * | 6/1994 | Lient et al. ........................... 403/154 |
| 5,331,695 | * | 7/1994 | Bales .................................. 403/69 X |
| 5,553,962 | * | 9/1996 | Eustache .............................. 403/154 |

FOREIGN PATENT DOCUMENTS

3434016 * 3/1986 (DE) .

OTHER PUBLICATIONS

P. R. Klarer, A Highly Agile Ground Assessment Robot (HAGAR) For Military Battlefield and Support Missions, SAND94–0408C Report, 1994.

P. R. Klarer, J. W. Purvis, R.A.T.L.E.R.: Robotic All Terrain Lunar Exploration Rovers, SAND92–1821C Report, 1992.

* cited by examiner

Primary Examiner—Lynne H. Browne
Assistant Examiner—Ernesto Garcia
(74) Attorney, Agent, or Firm—V. Gerald Grafe; Steve Rosenblatt

(57) ABSTRACT

An improved connection between articulated bodies for agile vehicles is disclosed. It features independent bodies which are connected to each other with concentric sleeves serving as the pivot to allow the bodies to rotate in a plane parallel to the direction of forward movement. The concentric bushings are preferably made of graphite/epoxy and secured to the chassis body sidewalls. Each of the body segments remains uninterrupted by the bushings which are principally disposed between the facing interior sides of the two bodies. The bearing assembly, which is preferably graphite/epoxy, is self-lubricating as it wears over time. Lateral movement is easily controlled, and relative rotation is also controlled by a collar which serves a dual function to control lateral movement of the bodies as well as relative rotation.

18 Claims, 5 Drawing Sheets

AGILE MOBILITY CHASSIS DESIGN FOR ROBOTIC ALL-TERRAIN VEHICLE

FIELD OF THE INVENTION

The field of this invention relates to chassis design for highly mobile all-terrain vehicles.

BACKGROUND OF THE INVENTION

Various robotic vehicles have been developed in the past. To obtain maximum agility, such vehicles have incorporated an all-wheel drive dual-body design where the bodies are disposed parallel to each other with a transverse pivot, generally at their mid-point, disposed transversely to the direction of forward or rearward motion. For example, highly mobile tractors have been designed using such a transversely mounted mid-body pivot for independent rotation in the vertical plane of forward motion about such pivot between the two bodies of the vehicle. This design is illustrated in U.S. Pat. No. 1,430,251. More recently, in the field of lunar exploration rovers, Klarer in "A Highly Agile Ground Assessment Robot (HAGAR) for Military Battlefield and Support Missions", SAND94-0408C (1994), and in "R.A.T.L.E.R.: Robotic All Terrain Lunar Exploration Rovers", SAND92-1821C (1992), has revealed similar designs. The basic concept of the prior art designs is illustrated in FIG. 1 of this application. FIG. 1 is a section view through a pivot 10 which extends through bodies 12 and 14. Each of the bodies 12 and 14 has stationary bushings, such as 16, 18, 20, and 22. The bushings 16, 18, 20 and 22 fully surround the pivot 10 so that the bodies 12 and 14 can rotate in a plane perpendicular to the longitudinal axis of pivot 10.

There are numerous problems with this type of design. In order to run power or communication wiring from one of the bodies 12 to the other 14, or vice versa, slits or openings were needed to be made between the bushings in each of the bodies 12 and 14 for entrances and exits of such wires. Thus, for example, slits made to the pivot 10 between bushings 16 and 18 would weaken the pivot 10 in that location. Additionally, if maintenance work was necessary or additional wires had to be added and connectors were disposed on wiring inside the pivot 10 in area 24, such connectors would get hung up on the slits used for access for such wires to get through the pivot 10 in the first place. Another problem with the use of a pivot 10 which goes cleanly through both bodies 12 and 14 is that as shown in FIG. 1, it separates the bodies 12 and 14 into two halves where communication with wiring becomes problematic. The prior art design shown in FIG. 1 also had problems in designing an effective travel stop. Although one attempted design was to put a projection on the pivot 10 which would, within bodies 12 or 14, strike a fixed object, the problem was that the pivot 10 was of such a diameter so as to present a significant lever arm on the projection mounted to its outer surface. Thus, what resulted in the past was shear failures of the travel stop. The function of a travel stop is significant in this particular prior art design in view of the fact that a variety of wires for both power and signals cross through the area 24 from body 12 to 14 and vice versa. This means that if undue relative rotation between bodies 12 and 14 were to occur, some of those wires could be cut, causing a battery or other power system failure or even a fire.

Yet another problem with the prior designs which used carbon composite bushings, with an aluminum pivot 10 was that galvanic action created maintenance problems at the interface of those two components.

Accordingly, the apparatus of the present invention seeks to improve the prior art design revealed in FIG. 1 and present a comparable degree of agility to the vehicle, while at the same time providing the enhanced benefits of a more compact design which alleviates the problems previously described in the prior art design of FIG. 1. Just how such problems in the prior art design are overcome is best understood by a review of the preferred embodiment of the invention which appears below.

SUMMARY OF THE INVENTION

An improved connection between articulated bodies for agile vehicles is disclosed. It features independent bodies which are connected to each other with concentric sleeves serving as the pivot to allow the bodies to rotate in a plane parallel to the direction of forward movement. The concentric bushings are preferably made of graphite/epoxy and secured to the chassis body sidewalls. Each of the body segments remains uninterrupted by the bushings which are principally disposed between the facing interior sides of the two bodies. The bearing assembly, which is preferably graphite/epoxy, is self-lubricating as it wears over time. Lateral movement is easily controlled, and relative rotation is also controlled by a collar which serves a dual function to control lateral movement of the bodies as well as relative rotation.

DETAILED DESCRIPTION OF THE PREFERRED EMBODIMENT

Figure 2:
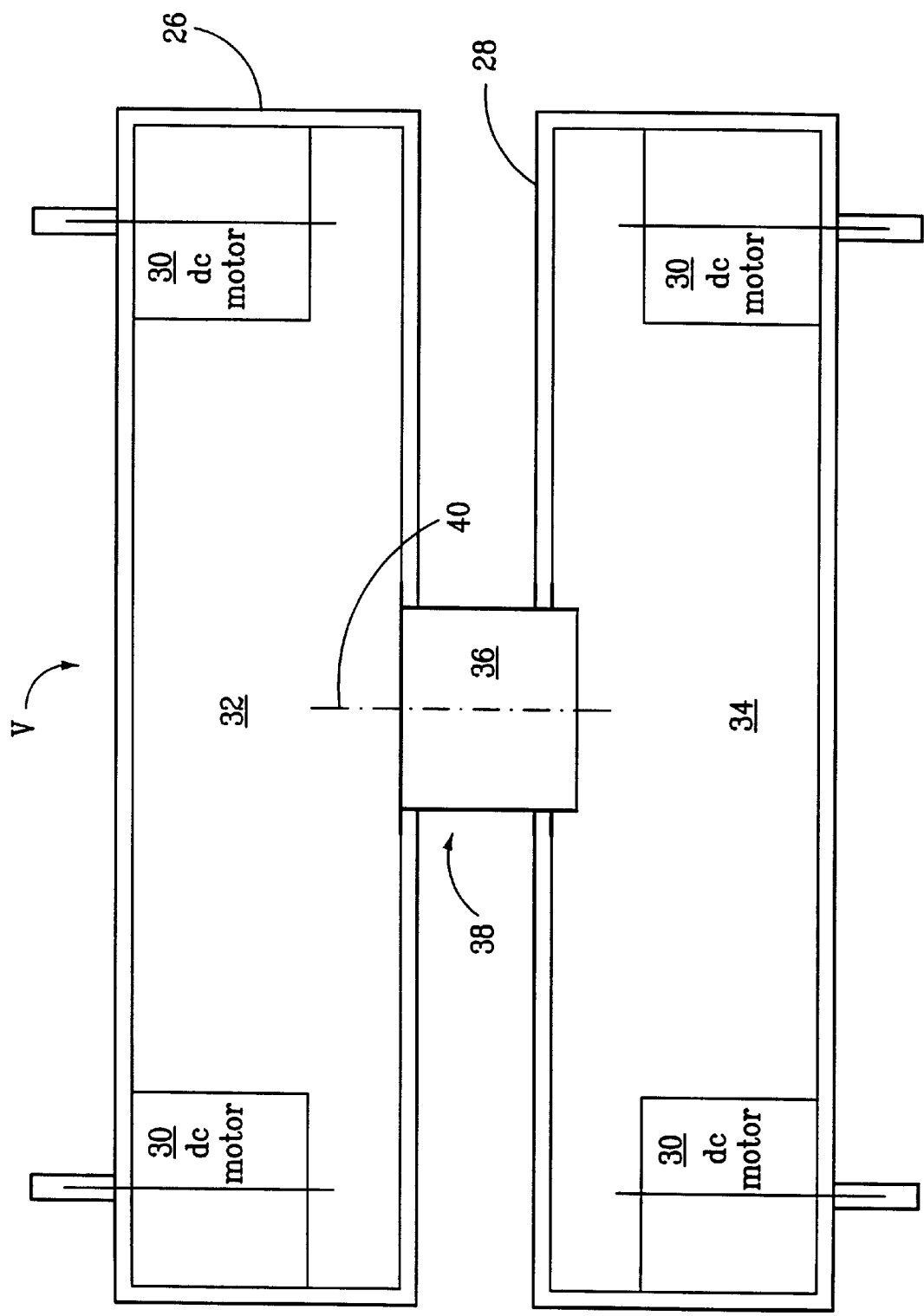
FIG. 2 is a similar sectional view of the present invention showing the pivot assembly between the bodies.
Figure 4:
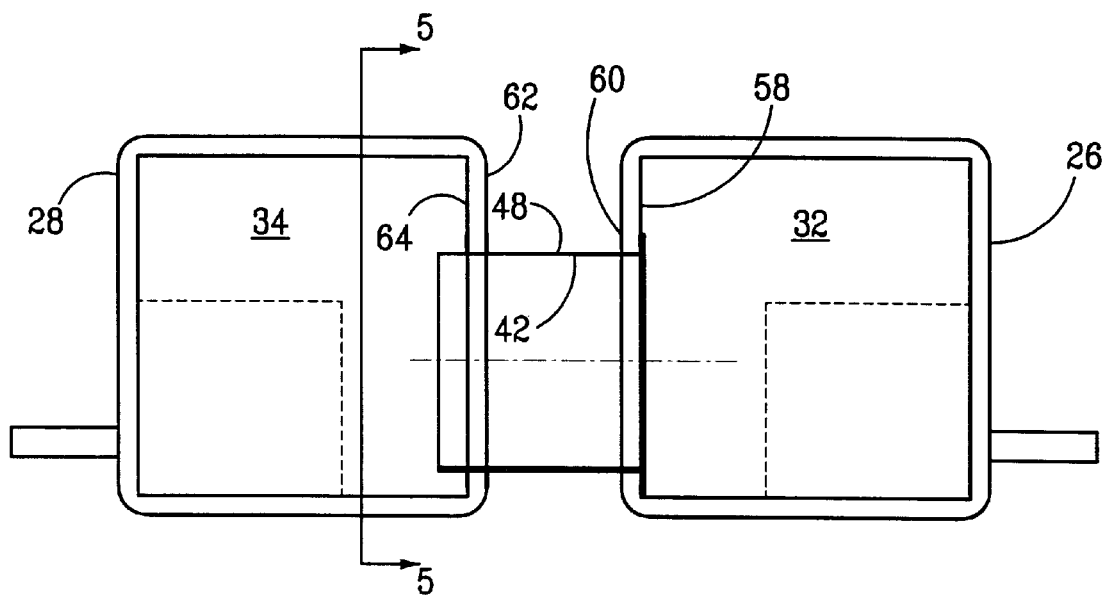
FIG. 4 is a vertical section through the pivot assembly.

Referring to FIG. 2, the vehicle V comprises parallel bodies 26 and 28. These are generally rectangular in cross-section, as shown in FIG. 4, and elongated, as shown in FIG. 2. They are generally enclosed and contain many components such as the drive motors 30 which can give a four-wheel drive capability to the vehicle V. Various power supplies, signal and power cables extend in the interior spaces 32 and 34 of the bodies 26 and 28, respectively. A passage 36 extends through the pivot assembly 38. Pivot assembly 38 has an axis 40. The bodies 26 and 28 rotate in a plane perpendicular to axis 40. There is a limit to the relative rotation by way of a travel stop, which is illustrated in FIG. 5, which will be described below.

Figure 3:
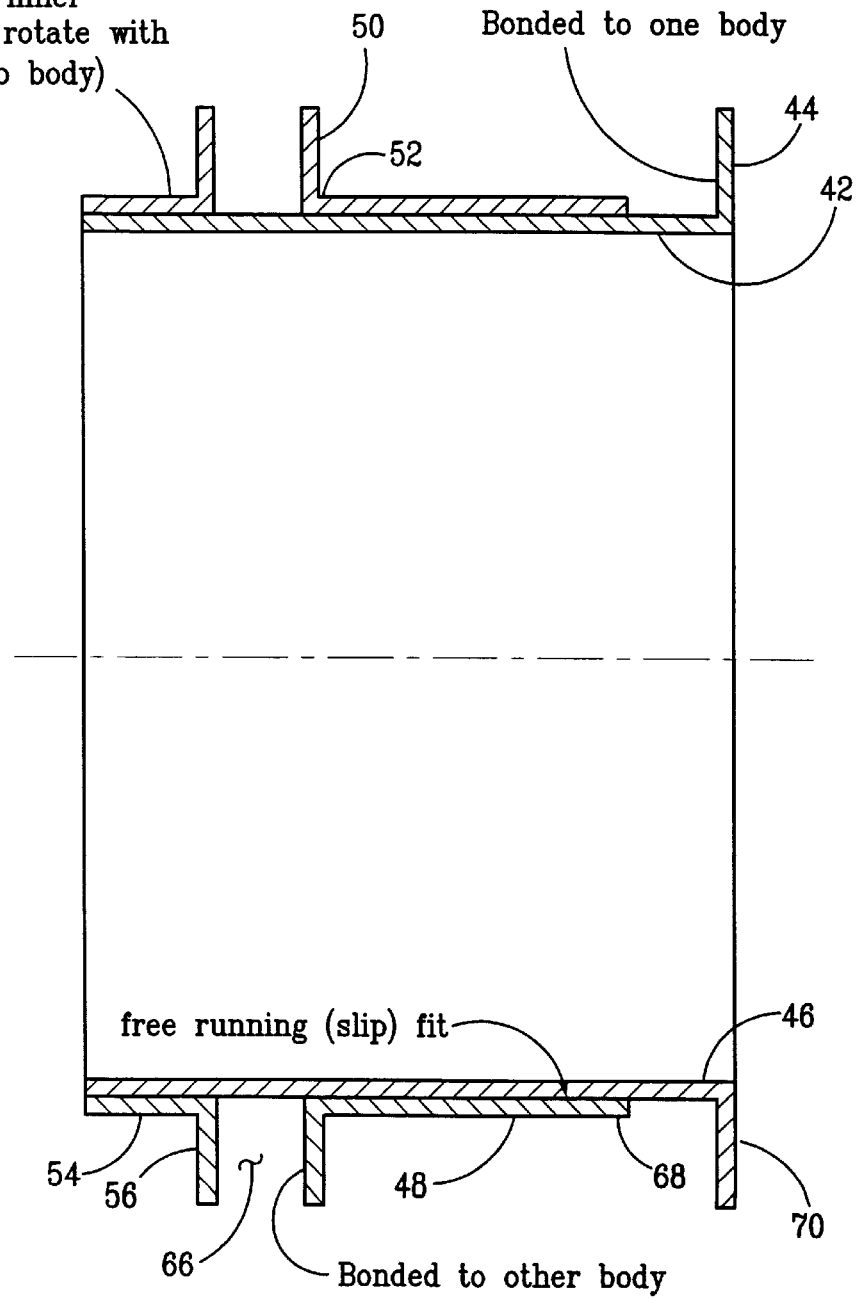
FIG. 3 is a detailed side view of the pivot assembly.

Before describing the travel stop, the details of the pivot assembly 38 will be described by referring to FIGS. 3 and 4. FIG. 3 shows the basic components which include an inner sleeve 42, which has a flange 44 at end 46. An outer sleeve 48 has a flange 50 at end 52. A stop collar 54 has a flange 56. The essential components and assembly now having been shown in FIG. 3, the mounting to the bodies 26 and 28 can be best seen in either FIGS. 2 or 4. The flange 44 is secured to the interior wall 58, with inner sleeve 42 extending through an opening 60 in body 26. The outer sleeve 48 is slipped over the inner sleeve 42 and its flange 50 is secured to wall 62 of body 28. Opposite exterior wall 62 is interior wall 64. The stop collar 54 is secured to the inner sleeve 42 inside of inner wall 64 such that flange 56 acts as a lateral travel stop. In essence, the gap 66 between flanges 50 and 56 is fixed; thus, flange 56 prevents the bodies 26 and 28 from moving away from each other. Lower end 68 eventually can contact surface 70 on flange 44 to limit the movement of bodies 26 and 28 toward each other.

The wall which comprises exterior wall 62 and interior wall 64, for example, can be a composite of carbon surfaces with an intermediate honeycomb. This wall assembly can also be used as the opposite wall in body 26. Sleeve 48 is then advanced through opening 60 in the composite wall and flange 44 is secured to interior carbon wall 58.

Figure 5:
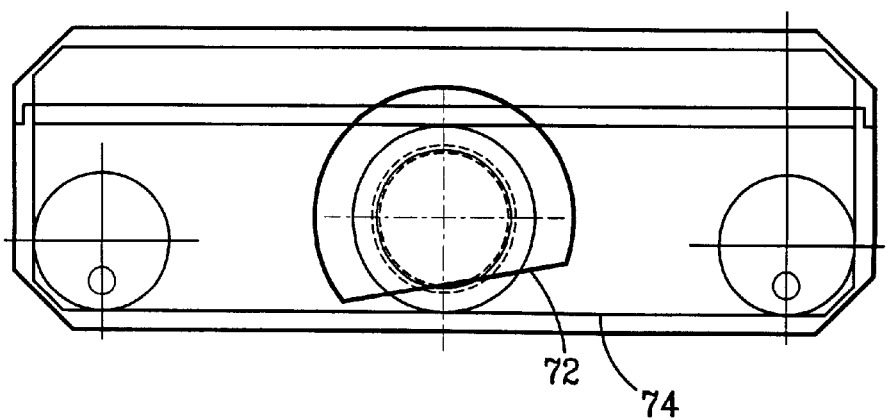
FIG. 5 is the view looking along lines 5—5 of FIG. 4.
Figure 6:
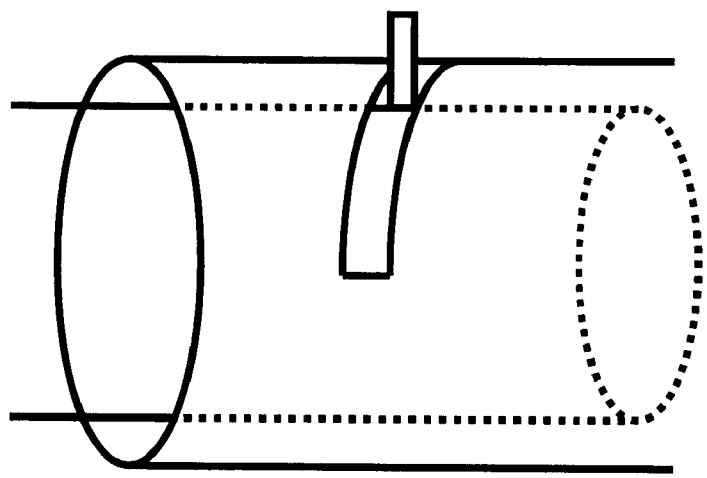
FIG. 6 is a schematic representation of a travel stop embodiment.

Referring now to FIG. 5, the travel stop feature is illustrated. Flange 56, which is inside body 28, has an oversized diameter with a flat spot or spots 72. Since the stop collar 54 is secured to the inner sleeve 42, upon a predetermined amount of rotation the flat spot 72 will strike the bottom 74 of body 28, thus limiting the ability of body 26 to continue rotating with respect to body 28. Going the other way, a travel stop for body 28 with respect to body 26 can be provided in a variety of ways. The outer sleeve 48 can have a circumferential slot through which extends a pin secured to the inner sleeve 42, as illustrated in FIG. 6. Accordingly, with the body 26 held fixed, the relative rotation of body 28 can be limited as the ends of the slot approach the pin. Those skilled in the art will appreciate that other mechanisms can be used to create the relative travel stops without departing from the spirit of the invention.

The preferred materials for the inner sleeve 42 and the outer sleeve 48 are graphite/epoxy to make them self-lubricating as they wear over time.

Figure 1:
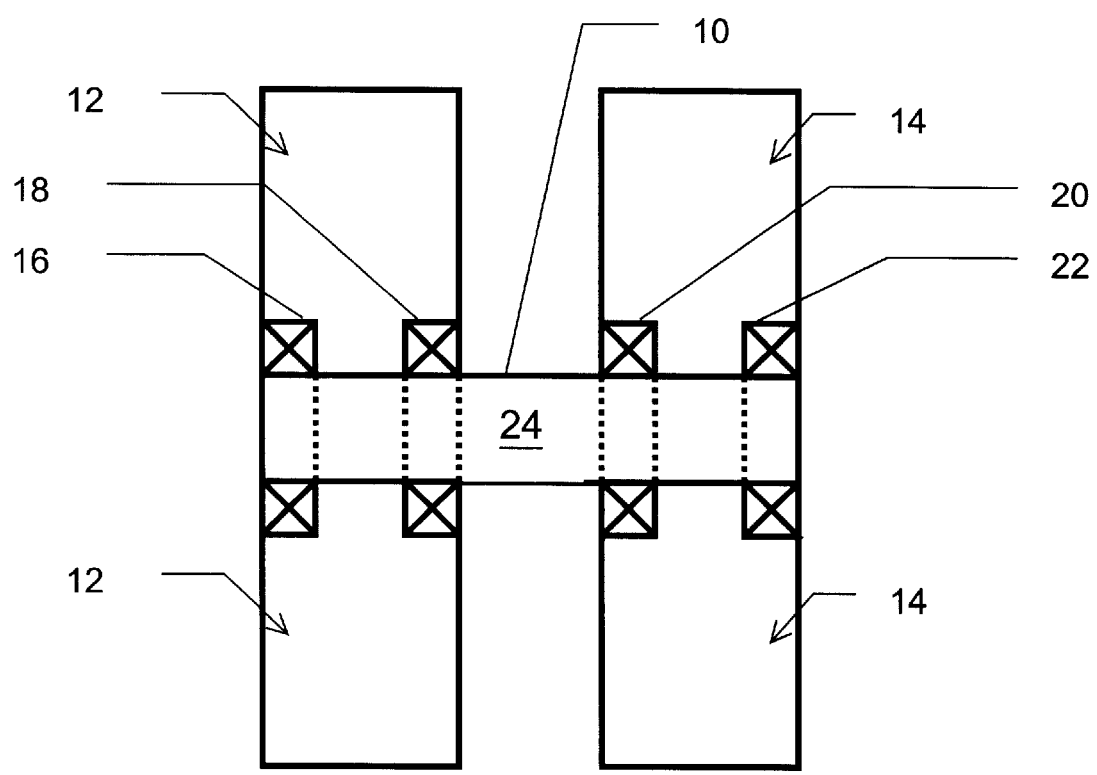
FIG. 1 is a sectional view of a prior art design looking down through the pivot at the two bodies which can rotate relative to each other about the pivot.

Those skilled in the art will readily appreciate the advantages of the design shown in FIGS. 2–5 as compared to FIG. 1. The two bodies 26 and 28 do not have valuable space internally taken up by the pivot 10 as shown in the prior art. Instead, spaces 34 and 32 are uninterrupted over the long dimension of the vehicle. This increases the ability to insert payload or components and dramatically increases the space for wiring and cooling gases to pass between the chassis bodies. The design is compact and low maintenance and incorporates in it a feature of controlling the spacing between the bodies 26 and 28, as well as relative rotation. The fact that the pivot assembly 38 does not extend transversely through the bodies 26 and 28 also dramatically reduces its weight, hence the increase in payload capability. While graphite/epoxy materials are preferred, other materials can be used for the pivot assembly 38 without departing from the spirit of the invention. The stop collar 54 can be removably mounted so that the bodies 26 and 28 can be separated easily if that is desired.

The foregoing disclosure and description of the invention are illustrative and explanatory thereof, and various changes in the size, shape and materials, as well as in the details of the illustrated construction, may be made without departing from the spirit of the invention.

What is claimed is:

1. An articulated vehicle chassis for a vehicle capable of translational motion along a longitudinal axis of said chassis, comprising first and second aligned bodies, said bodies comprising walls having an outer and inner face; and a pivot connection comprising: a tubular structure oriented generally transversely to the longitudinal axis and extending to a wall on said first body and another wall on said second body without completely traversing either of said bodies, wherein said tubular structure does not intersect longitudinal axes of both said bodies.

2. The chassis of claim 1, wherein: said tubular structure comprises first and second, concentrically mounted sleeves.

3. The chassis of claim 2, wherein: said sleeves comprise a longitudinal axis and are restrained as to a predetermined amount of lateral movement along their longitudinal axis.

4. An apparatus comprising first and second bodies connected with a pivot connection, said bodies comprising walls having an outer and inner face, said pivot connection comprising: a tubular structure oriented generally transversely to said walls and extending to a wall on said first body and to a wall on said second body without completely traversing either of said bodies, wherein said tubular structure comprises concentrically mounted sleeves, wherein said sleeves comprise a longitudinal axis and are restrained as to a predetermined amount of lateral movement along their longitudinal axis, and wherein: said sleeves are restrained as to a predetermined relative rotation about their longitudinal axis.

5. The chassis of claim 2, wherein: said first sleeve is disposed between said bodies.

6. The chassis of claim 5, wherein: said second sleeve extends through facing walls of said bodies.

7. The chassis of claim 6, wherein: said first sleeve is mounted over said second sleeve.

8. The chassis of claim 7, wherein: said first sleeve is secured to said first body and said second sleeve is secured to said second body.

9. The chassis of claim 8 wherein in said connection: said second sleeve extends through a wall on said first body and further comprises a travel stop.

10. An apparatus comprising first and second bodies connected with a pivot connection, said bodies comprising walls having an outer and inner face and defining a space therein, said pivot connection comprising: a tubular structure oriented generally transversely to said walls and extending to a wall on said first body and to a wall on said second body without completely traversing either of said bodies, wherein said tubular structure comprises concentrically mounted sleeves, wherein a first of said sleeves is disposed between said bodies; wherein a second of said sleeves extends through facing walls of said bodies, wherein said first sleeve is mounted over said second sleeve; wherein said first sleeve is secured to said first body and said second sleeve is secured to said second body; wherein said second sleeve extends through a wall on said first body and further comprises a travel stop; and wherein: said second sleeve comprises a mounting flange to secure said second sleeve fixedly to a wall of said second body; and said travel stop comprises a stop flange mounted to said second sleeve and disposed inside a wall of said first body without being secured to said first body.

11. The apparatus of claim 10, wherein said stop flange limits relative movement of said sleeves along their longitudinal axis.

12. The apparatus of claim 10, wherein said stop flange comprises a truncated circular shape to limit relative rotation of said bodies about the longitudinal axis of said sleeves.

13. The chassis of claim 8, wherein in said connection: said first sleeve comprises a flange at a first end secured to an outer wall of said first body, said first sleeve having a second end which, when said second end engages a wall on said second body, limits movement of said bodies toward each other along the longitudinal axis of said sleeves; and said connection further comprising a third sleeve mounted with the second sleeve within the first body such that the third sleeve limits movement of the second sleeve.

14. The chassis of claim 2, wherein: said sleeves are made of a self-lubricating material.

15. The chassis of claim 14, wherein: said sleeves are made of a graphite and epoxy mixture.

16. The apparatus of claim 12, wherein said first sleeve comprises a flange at a first end secured to an outer wall of one of said bodies, said first sleeve having a second end, which, when said connection end engages a wall on the other of said bodies, limits movement of said bodies toward each other along the longitudinal axis of said sleeves.

17. The apparatus of claim 16, wherein said sleeves are made of a self-lubricating material.

18. The apparatus of claim 17, wherein said sleeves are made of a graphite/epoxy mixture.

* * * * *